(12) United States Patent
Emig et al.

(10) Patent No.: US 6,706,086 B2
(45) Date of Patent: Mar. 16, 2004

(54) DUST FILTER BAG INCLUDING A HIGHLY POROUS BACKING MATERIAL PLY

(75) Inventors: Dietmar Emig, Aschau i. Ch. (DE); Ernst Raabe, Raubling (DE); Albrecht Klimmek, Bruckmuhl (DE)

(73) Assignee: FiberMark Gressner GmbH & Co. KG, Bruckmuhl (DE)

( * ) Notice: Subject to any disclaimer, the term of this patent is extended or adjusted under 35 U.S.C. 154(b) by 0 days.

(21) Appl. No.: 09/978,888

(22) Filed: Oct. 16, 2001

(65) Prior Publication Data

US 2002/0083690 A1 Jul. 4, 2002

(30) Foreign Application Priority Data

Oct. 16, 2000 (DE) .......................... 100 51 186

(51) Int. Cl.$^7$ ................................. B03C 3/11
(52) U.S. Cl. ..................... 55/486; 55/382; 55/487; 55/DIG. 2; 55/DIG. 5; 55/DIG. 19; 95/57; 95/287; 95/78; 96/15; 96/69; 15/347; 15/352
(58) Field of Search ................ 55/382, 486, 487, 55/DIG. 2, DIG. 5, DIG. 39; 95/57, 78, 287; 96/15, 69; 15/347, 352

(56) References Cited

U.S. PATENT DOCUMENTS

| | | |
|---|---|---|
| 4,589,894 A | 5/1986 | Gin et al. |
| 5,080,702 A | 1/1992 | Bosses |
| 5,167,765 A | 12/1992 | Nielsen et al. |
| 5,437,910 A | 8/1995 | Raabe et al. |
| 6,156,086 A * | 12/2000 | Zhang .......................... 55/527 |
| 6,171,369 B1 * | 1/2001 | Schultink et al. ............. 55/487 |
| 6,183,536 B1 * | 2/2001 | Schultink et al. |
| 6,514,325 B2 * | 2/2003 | Cox et al. ..................... 55/486 |

FOREIGN PATENT DOCUMENTS

| | | |
|---|---|---|
| DE | 299 07 699.7 | 8/1999 |
| EP | 338 479 B1 | 8/1992 |
| EP | 960 645 A2 | 12/1999 |
| WO | WO 97/30772 | 8/1997 |

* cited by examiner

Primary Examiner—Ming-Chau T. Pham
(74) Attorney, Agent, or Firm—Scully, Scott, Murphy & Presser

(57) ABSTRACT

A dust filter bag having a highly porous backing material ply and a method for producing the dust filter bag. The dust filter bag includes at least one filter material ply and at least one backing material ply, the backing material ply possessing an air permeability of at least 900 l/m$^2$ x s, a burst strength of at least 70 kPa, a rupture strength longitudinally better than 10 and transversely better than 3 N, a flexural rigidity longitudinally better than 0.5 cN cm$^2$ and transversely better than 0.25 cN cm$^2$, a basis weight of 30–80 g/m$^2$ and a droplet sink-in time of less than 10 minimum. The dust filter bag can be produced by the following steps: mixing fibers including cellulose fibers and fusible fibers into a homogenous fiber mix, processing the fiber mix into a fiber web by wet laying, drying the fiber web, curing the dried fiber web by thermofusion into a backing material ply, processing the backing material ply with a filter material ply into a raw bag, and finishing the raw bag into a dust filter bag.

10 Claims, No Drawings

DUST FILTER BAG INCLUDING A HIGHLY POROUS BACKING MATERIAL PLY

BACKGROUND DESCRIPTION

Field of the invention

The invention relates to a dust filter bag including a highly porous backing material ply and to a method of producing the dust filter bag.

There has been a significant increase in recent years in the demands on the filtration capacity of dust filter bags as employed in modern vacuum cleaners. In this respect it is especially in the field of fine-particle arrestance that is gaining ever-increasing significance, achievable by the use of e.g. meltblown fibrillated fiber or nanofiber non-woven filtration layers. These filtration layers are combined with backing materials and then processed into dust filter bags.

Backing material for high-efficiency filtration layers comprises, as a rule, paper since this offers the advantage of being very good to process on conventional dust filter bag makers. Corresponding paper backings are disclosed in WO 97/30772 and in EP 0 960 645. In making use of currently conventional bonding and folding techniques, paper backing materials feature, more particularly, the advantage of high productivity in bag production. Furthermore, paper backings can be made sufficiently rugged for use in vacuum cleaners.

One major drawback in using papers as the backing is the restricted air permeability, resulting in a low system suction/blow capacity. Making a paper backing with higher air permeability reduces the strength of the material: i.e. significantly increasing the pulp percentages as suitable for achieving high values of air permeability in paper-making would be at the expense of the strengthening components. The strength of the paper would no longer be sufficient to withstand the mechanical stresses on the bag in the vacuum cleaner during operation, ending in the bag bursting. Boosting the percentage of strengthening raw material components by increasing the total basis weight is likewise no solution since increasing the total basis weight in turn reduces the air permeability of the paper.

To get round the disadvantage of high filtration resistance and the undesirable tendency of the material becoming blocked, spunbond nonwovens have been employed as the backing materials for high efficiency filtration layers. Thus, there is described e.g. in WO 97/30772 a vacuum cleaner bag which comprises a spunbond nonwoven as the outer ply of the bag. The particular advantage in this arrangement as described is the low blockage tendency of the bag since the composite of the backing material and filtration layer has a high air permeability.

However, the big disadvantage is the textile-like structure of spunbond nonwovens which, although having the desired properties as to high air permeability whilst featuring sufficient strength in use as a backing in vacuum cleaner bags, fail to permit processing on conventional vacuum cleaner bag makers in employing conventional technologies. This is due to these materials not permitting folding as needed for this processing, on the one hand, and on top of this the water-based size and adhesive types available for this production process being unsuitable due to the polymer raw material structure of spunbond nonwovens. On the other, printing the outer ply of the bag, a mandatory requirement in this branch, is not possible with known grades of spunbond nonwovens. In addition to this, for processing such materials a stamping process needs to be used in which the individual bags are stamped out by a hot stamp with simultaneous sealing of the seams. This process is unsatisfactory because of its low productivity.

It is against this background that the invention is based on the objective of providing a dust filter bag which whilst permitting high system suction/blower capacity, is sufficiently rugged for use in vacuum cleaners and which is simple and cost-effective to manufacture; the invention likewise providing a corresponding method of production.

This objective is achieved in accordance with the invention by a dust filter bag comprising at least one filter material ply and at least one backing material ply, the backing material ply featuring an air permeability of at least 900 l/m$^2$×s, a burst strength of at least 70 kPa, a rupture strength longitudinally better than 10 N and transversely better than 3 N, a flexural rigidity longitudinally better than 0.5 cN cm$^2$ and transversely better than 0.25 cN cm$^2$, a basis weight of 30–80 g/m$^2$ and a droplet sink-in time of less than 10 min.

The air permeability of the backing material ply employed in accordance with the invention amounts to at least 900 l/m$^2$×s, preferably 900 l/m$^2$×s to 8000 l/m$^2$×s, particularly preferred being an air permeability in the range of 1500–3500 l/m$^2$×s, all as measured in accordance with EN ISO 9237. An air permeability of at least 900 l/m$^2$×s permits a sufficiently high system suction/blower capacity.

The backing material ply as used in accordance with the invention has a burst strength of at least 70 kPa, preferably 70 kPa to 350 kPa, particularly preferred being a burst strength in the range of 120 to 210 kpa, all measured in accordance with DIN 53141 but using a test surface area of 10 cm$^2$ instead of 7.8 cm$^2$ in deviating from this DIN standard. It has been discovered that when the burst strength of the backing material ply is at least 70 kPa the dust filter bag in accordance with the invention is sufficiently rugged to prevent the bag from bursting when used in the vacuum cleaner.

The rupture strength of the backing material ply in the dust filter bag in accordance with the invention is at least 10 N longitudinally, preferably 10 N to 60 N, particularly preferred being a rupture strength longitudinally in the range of 20 to 40 N, as measured in accordance with EN ISO 1924-2 (N/15 mm strip width).

The rupture strength of the backing material ply in the dust filter bag in accordance with the invention is at least 3 N transversely, preferably 3 N to 50 N, particularly preferred being a rupture strength transversely in the range of 10 to 30 N, as measured in accordance with EN ISO 1924-2 (N/15 mm strip width).

The flexural rigidity of the backing material ply in the dust filter bag in accordance with the invention is better than 0.5 cN cm$^2$ longitudinally, preferably better than 1.0 cN cm$^2$, the flexural rigidity being better than 0.25 cN cm$^2$ transversely, preferably better than 0.75 cN cm$^2$, all measured in accordance with DIN 53864 with a specimen width of 15 mm (a specimen width of 20 mm being used in accordance with DIN 53864).

It has been discovered in accordance with the invention that a backing material ply, comprising a corresponding rupture strength and a corresponding flexural rigidity as indicated above, permits processing on a conventional bag maker as used in the production of dust filter bags including paper backing materials. Being able to use a conventional bag maker now permits simple and cost-effective production of the dust filter bag in accordance with the invention.

In addition, it has been discovered that for assuring adequate adhesiveness with water-based adhesives as used generally in dust filter bag production, it is important that the backing material ply in accordance with the invention needs to feature a droplet sink-in time of less than 10 min, preferably less than 5 min, particularly preferably less than 1 minute. The droplet sink-in time is measured as follows: a droplet of ink (formulated of 50 ml Pelikan ink 4001 and 950 ml distilled water) is applied to the surface of the specimen with a burette from a height of 1 cm. The droplet sink-in time corresponds to the time between the first contact of the droplet with the surface and the point in time at which no bright spots are discernible on the surface, i.e. until the droplet has fully sunk into the material. As long as the droplet has not sunk into the specimen, the bright spot is still discernible. Once the droplet has totally diffused into the material, no liquid is visible on the surface and the bright spot has disappeared.

The basis weight of the backing material in accordance with the invention amounts to 30 to 80 g/m$^2$, preferably 40 to 60 g/m$^2$ as determined by EN ISO 536.

In addition, the backing material ply in accordance with the invention features a righting angle preferably of less than 90°, more particularly preferred less than 55°. The righting angle is a measure of the resiliency after folding and is determined as follows: a specimen having a width of 100 mm and a length of 150 mm is folded in the middle parallel to the longitudinal edge, the filter side needing to face outwards. The fold is made with a steel roller (diameter 80 mm; mass 9 kg) in a direction so that the folded paper is located in the middle of the roller. The paper springs back. The angle materializing after one minute is determined with a protractor.

The thickness of the backing material ply amounts preferably to 0.05–1 mm, particularly preferred 0.2–0.5 mm as determined in accordance with EN ISO 534 for a feeler pressure of 20 kPa (mm).

The above physical properties of the backing material ply in accordance with the invention can be set during the method of producing the backing material. The backing material can be produced by a method comprising the following steps:

mixing fibers including cellulose fibers and fusible fibers into a homogenous fiber mix, wetlaying the fiber mix into a fiber web, drying the fiber web, curing the dried fiber web by thermofusion.

The above physical properties materialize more particularly by suitably selecting the quantities and nature of the fibers as well as by specific control of the thermofusion step.

The basis weight is set by the total weight of the fibers used independently of the mixing ratio. The mixing ratio has little influence on the resulting thickness. Cellulose fibers generally reduce the droplet sink-in time which, however, can be set as specified by adding wetting agents during the process of producing the web or in making the bag.

The fusible fibers used enhance the air permeability (the more fibers, the higher the air permeability) and boost the strength values (bursting and rupture strength) of the web as formed since more linkage points are available.

To attain the physical properties essential to the invention use is made preferably of 20 to 90% by weight, particularly preferred being 40 to 65% by weight cellulose fibers and 80 to 10% by weight, particularly preferred being 60 to 35% by weight fusible fibers, each relative to the total weight of the fibers. To boost the mechanical strength, more particularly the burst strength of the backing material, binders may be added.

The cellulose fibers used in accordance with the invention cover long-fiber pulps of sulfated pine, short-fiber pulps of eucalyptus or pulps obtained from annual plants such as e.g. hemp, abaca and sisal.

The fusible fibers used in accordance with the invention are e.g. fusible fibers of polyolefin, polyamide or polyester or bicomponent fibers, preference being given to bicomponent fibers. Bicomponent fibers are fibers composed of two different polymers, each of which has a different melting point, enabling these fibers to be processed by the polymer having the lower melting point melting before attaining the melting point of the higher melting point polymer. Bicomponent fibers may be structured, for example, as core/sheath fibers or as side-by-side fibers, preference being given in accordance with the invention to the core/sheath type.

Practically all polymers may be employed as materials in bicomponent fibers, examples of which are bicomponent fibers of polypropylene and polythene, polypropylene and polyester, polypropylene and copolyester and polyester and nylon 6.

Processing the bicomponent fibers is preferably done either by air or wet laying, particularly preferred being wet laying. Suitable bicomponent fibers for wet laying are disclosed in U.S. Pat. No. 5,167,765, these being bicomponent fibers comprising as a first component polyester or polyamide whilst the second component substantially comprises a linear low-density polythene copolyester having a density in the range of 0.88–0.45 g/cm$^3$ and grafted high-density polythene, HDPE having an initial density in the range of 0.94–0.965 g/cm$^3$, grafted with maleic acid or maleic acid anhydride, resulting in a succinic acid or succinic acid anhydride chain at the HDPE polymer. The first component forms preferably the core of the bicomponent fiber, whilst the second component preferably forms the sheath of the bicomponent fiber. The first component comprises preferably a melting point which is at least 30° C. higher than that of the second component. The bicomponent fibers feature a length/diameter ratio of approx. 1:100 to approx. 1:2000. The lengths generally amount to approx. 1 mm to approx. 75 mm, preferably approx. 10 mm to 15 mm. Such bicomponent fibers are generally cut on conventional processing machines.

Particularly preferred are bicomponent fibers comprising a core component of polyethylene terephthalate and a sheath component of copolyolefin, the core preferably melting at a temperature exceeding 250° C. and the sheath preferably melting in a temperature range of 110–150° C.

In addition to the cellulose fibers and the fusible fibers, glass fibers and synthetic fibers may be used as fiber components. As synthetic fibers e.g. cellulose regenerate (titanol 0.55–6.6 dTex) and so-called staple fibers, e.g. polyester, polyamide, polyacrylnitrile, polymer, polyvinyl alcohol (titanol 0.33–6.6 dTex) are suitable, preference being given to staple fibers as synthetic fibers, these being fibers cut to a uniform length and consisting of several single fibers. The bundles are cut in manufacturing the fibers to a specific uniform length. Usual fiber lengths are in the range of 1 mm to 75 mm. Selecting the fiber grade is done in accordance with the product specification. The synthetic fibers may be both separately dispersed and simultaneously aggregated with other fibrous substances (e.g. cellulose fibers).

The synthetic fibers produce a textile character in the web formed, the web becoming floppy and soft, i.e. increasing the percentage of synthetic fibers adds to the righting angle, the flexural rigidity becomes less and the material becomes less easy to cut, stamp and fold.

It is particularly preferred to use bicomponent fibers and synthetic fibers to a minimum of 30% by weight relative to the weight of the backing material ply, resulting in the backing material ply in accordance with the invention becoming fusible.

On the other hand, the backing material ply in accordance with the invention may be rendered hot-sealable by adding a hot sealing agent.

Processing the fibers is done as follows: firstly, the individual components are mixed in a mixer into a homogenous fiber mix. This is followed by wet laying in which the homogenous fiber mix is homogenously distributed on a paper maker filter and formed into a fiber web or endless web which is then forwarded to the drying zone of the paper maker. Subsequently, the web is dried at a temperature below the melting point of the fusible fibers, e.g. below the melting point of the sheath of the bicomponent fiber. For this purpose, use is made of steam or oil-heated cylinders or so-called though-air dryers. In though-air dryers hot air is suctioned through the web.

The resulting dried web can then be impregnated optionally in a so-called size press with binders to boost the mechanical stress of the backing material ply. The binder usable in accordance with the invention includes natural binders such as starch as well as synthetic binders such as polyvinyl acetate, polyvinyl alcohol and polyacrylate. The binder is preferably added in an amount of up to 30% by weight relative to the weight of the backing material ply.

Subsequently, the ply is forwarded to the afterdrying zone of the paper maker. Integrated in the afterdrying zone is a dryer, e.g. a through-flow dryer or a cylinder dryer (contact drying), preferably a throughflow dryer which dries the wet web e.g. by suctioning hot air therethrough to cure the dried fiber web by thermofusion. During this step the parameters air temperature, airflow and dwell time of the web in the dryer are controlled so that sufficient energy is supplied to melt the fusible fibers—in the case of bicomponent fibers only the polymer having the lower melting point. These parameters can each be set independently of the other. Thus, e.g. a lower temperature or lower airflow can be compensated by a long dwell time of the formed web. In this arrangement, the specific values for the individual parameters of the method mainly depend on the nature and quantities of the fibers employed. When, for example, the melting point of the sheath of a bicomponent core/sheath fiber is of the order of 110° C. and the melting point of the core in excess of 200° C., the air is suctioned through at a temperature of 150° C. for a dwell time of 1 s and a flow of 600 m$^3$/h.

If the energy input is too high, the higher melting component of the bicomponent fibers is likewise melted and the complete fiber contracts into a droplet, this destroying the nonwoven structure with the risk of holes forming. In addition to this, the required strength values fail to be attained since the core fiber is no longer available as the component boosting the strength and the number of polymer links (bonds) is significantly reduced.

To further boost the strength the backing material ply may be optionally impregnated with binders also after the thermofusion step in the way as described above.

The resulting backing material features good bonding, folding, stamping and cutting properties.

From the backing material in accordance with the invention the dust bag in accordance with the invention can be produced in substantially two operations which may take place on separate machine assemblies:

(a) fabricating the raw bag,
(b) finishing it into the finished bag.

To fabricate the raw bag the backing material is presented to the machine reeled. From an unreeler station the backing material web is formed tubular with application of a constant tug in being drawn into the bag maker, the tube being closed with a longitudinal seam. After this, the tube is cut to the corresponding length and one of the tube ends bottomed. This is done on the bottom folder drum by forming a tab which is folded over and bonded together.

For presenting further plies on the backing material ply, more particularly a filter material ply, the raw bag maker is provided with a liner. The webs of these further plies are presented to the outgoing web, e.g. the outer ply backing material prior to tubing in thus producing a bag-in-a-bag.

This raw bag, be it single-ply or multi-ply, is then finished on a separate machine by being furnished with a holder plate in keeping with the vacuum cleaner model (block bottom). The second end of the tube, still open, is closed off in the form of a wrap bottom by wrapping and bonding the tube.

In this method the backing material ply may exist as an inner ply and/or outer ply.

Filter material plies used preferably in accordance with the invention are described in German patent DE 38 12 849 C3. The fiber nonwoven ply in accordance with DE 38 12 849 C3 comprises a fibrillated fiber nonwoven having an air permeability in the range of 200–1500 l×m$^2$×s for a pressure of 2 mbar, an average fiber diameter of 0.5 to 18 μm and a rupture strength longitudinally of 2 to 12 N per 15 mm strip width and transversely of 1 to 10 N per 15 mm strip width. Preferably the fibrillated fiber nonwoven is structured as a melt-blown nonwoven, particularly preferred of a thermoplastic material such as polyolefin, polyamide, polyester or copolymers thereof.

A furthermore preferred fiber nonwoven ply is a nanofiber nonwoven ply having an average fiber diameter of 10 to 1000 nm, preferably 50 to 500 nm, a basis weight (ISO 536) of 0.05 to 2 g/m$^2$, preferably 0.1 to 0.5 g/m$^2$ and an air permeability (ISO 9237) of 1500 to 20,000 1/m$^2$×s, preferably 2000 to 10,000 1/m$^2$×s as described in German utility model specification DE 29 907 699.7.

The term "nanofiber" makes it clear that the fibers have a diameter in the nanometer regime, especially from 10 to 1000 nm, preferably from 50 to 500 nm.

The nanofiber nonwovens employed in accordance with the invention usually consist of polymers soluble in water, soluble in an organic solvent or thermoplastic polymers.

Particularly preferred polymers soluble in water are polyvinyl alcohol, polyvinyl pyrrolidon, polyethylene oxide or copolymers thereof, cellulose, methyl cellulose, propyl cellulose, starch or mixtures thereof.

Particularly preferred polymers soluble in an organic solvent are polystyrene, polycarbonate, polyamide, polyurethane, polyacrylate, polymethylacrylate, polyvinyl acetate, polyvinyl acetal, polyvinyl ether, cellulose acetate or copolymers or mixtures thereof.

Particularly preferred thermoplastic polymers are polythene, polypropylene, polybuten-1, polymethyl pentene, polychlorinated trifluoroethylene, polyamide, polyester, polycarbonate, polysulfone, polyether sulfone, polyphenyl sulfide, polyacryletherketone, polyvinylidene fluoride, polyoxymethylene, polyurethane or copolymers or mixtures thereof.

The nanofiber nonwoven representing the component decisive for a high arrestance of fine dusts is preferably produced by spinning a thermoplastic polymer in the molten condition from nozzles in a strong electric field into nanofibers and deposited in the form of a sheet on a base which is passed over a counterelectrode (this method being known as electrospinning). The fiber diameter can be controlled by the process parameters, namely the viscosity of the polymer solution. The basis weights of the nanofiber nonwovens are determined, for one thing, by the mass flow through the nozzles and, for another, by the speed with which the base is moved under the nozzles. The air permeability of the nanofiber nonwoven is influenced by the thickness of the fibers and their packing density.

Producing nanofibers of various polymers is described by Darell H. Reneker and Iksoo Chun in the publication "Nanometer diameter fibres of polymer, produced by electrospinning", Nanotechnology 7, 1996, pages 216–223.

The dust filter bag in accordance with the invention may comprise in addition to the filter material ply and the backing material ply further plies e.g. supporting elements such as supporting and intermediate fleeces.

The individual plies of the dust filter bag in accordance with the invention may be fixedly joined to each other or they may be freely movable relative to each other. A fixed joint between filter material ply and backing material ply is attainable by depositing the fibers of the filter material ply directly on the backing material ply in the thermoplastic condition, whereas joining the filter material ply to the backing material ply via a longitudinal bonding seam results in the filter material ply remaining substantially freely movable relative to the backing material ply.

If the filter material ply features a low mechanical strength and is not directly deposited on the backing material ply the dust filter bag preferably comprises a supporting element. Loosely joining backing material ply and filter material ply is possible by providing a longitudinal bonding seam between supporting element and backing material such that the filter material ply is held between backing material ply and supporting element.

One embodiment consists of loosely joining the filter material ply to an internal supporting element via a longitudinal bonding seam and, where necessary, additionally via bonding in the bottom portion of the bag so that the filter material ply and supporting element are freely movable and the filter material ply is held by the backing material ply and the inner supporting element.

In a further embodiment the filter material ply with the supporting element is processed into a duplet combination via a checkerboard or full-surface impregnation and/or coating. Special binders are suitable for laminating, preference being given to starch, acrylates and vinyl acetates as the adhesive. Another possibility is to join the filter material ply to the supporting element by thermobonding without any binder, e.g. calandering. This two-ply version can also be produced by directly depositing the fibers used in producing the filter material ply on the supporting element and joining them to the supporting element in the thermoplastic condition. The finished two-ply combination can subsequently made to face the backing material ply via the filter material ply or supporting element.

If the individual plies are to be joined only loosely in the finished bag, the backing material ply, filter material ply and, where provided, the inner supporting element are presented in separate webs to the bag maker where they are processed into the bag by known ways and means. When using a duplet combination of filter material ply and supporting element or filter material ply and backing material ply, the filter material ply and supporting element or the filter material ply and backing material ply are married into a web before being presented to the bag maker. The resulting combination and the backing material ply or, where necessary, the supporting element, if desired, are then drawn on two webs into the bag maker and further processed by known ways and means into the bag.

Filter material ply and backing material ply are preferably combined with each other so that the filter material ply does not cover the full width of the backing material ply in thus forming one or two edgings on the backing material ply as disclosed in EP 0 635 297 A1.

The following examples detail the excellent properties of the backing material in accordance with the invention as compared to conventional filter materials.

EXAMPLES

Example 1

Producing the Backing Material as Employed In Accordance With the Invention Water is presented to the pulpers to which the cellulose fibers, short-cut polyester fibers and core/sheath fibers (staple fibers of >81% polyethylene terephthalate core with a melting point of 256° C. and >51% copolyolefin sheath having a melting point of 110–150° C. available from Kosa, Salisbury, N.C., USA as "copolyolefin bicomponent fiber") consisting of polyethylene terephthalate and a sheath of copolyoleffin are added, and the fibers dispersed in water with agitation. This results in the cellulose fibers being dispersed alone and the polythene fibers together with the core/sheath fibers in taking care to ensure total dispersion since any aggregated fiber entanglements forming in further processing has a negative effect on product performance. In a mixer the two dispersions are then married to obtain a fiber mix of 46% by weight cellulose fibers of the annual plant abaca, 16% by weight short-cut polythene fibers (12 mm) and 38% by weight core/sheath fibers (copolyolefin bicomponent fiber, available from Kosa, Salisbury, N.C., USA), the % by weight indications being as dry in analysis. This homogenous fiber mix is homogenously spread on the filter of paper maker and the majority of the water drawn off through the filter. In this arrangement, care is taken to achieve a uniform fiber formation so that the finished fiber mix is homogenous and is homogenously distributed on the filter. In the subsequent drying process the water sill contained in the formed web is removed by elevating the temperature without attaining the melting temperature of the bicomponent fiber. The dry formed web is impregnated in a so-called size press with the binder polyvinyl acetate in a quantity so as to be contained to 9% by weight in the dried material before being forwarded to the afterdrying zone of the paper maker. Integrated in the afterdrying zone is a through-flow dryer which dries the wet impregnated web by suctioning hot air therethrough. During this step the air temperature is 150° C., airflow 600 $m^3/h$ and dwell time is 1 s.

The physical properties of the resulting material as cited in the following were determined in accordance with the test methods as listed below:

| | |
|---|---|
| Basis weight: | EN ISO ($g/m^2$) |
| Thickness: | EN ISO 534 feeler pressure: 20 kPa (mm) |
| Air permeability: | EN ISO 9237 ($l/m^2s$) |
| Rupture strength: | EN ISO 1924-2 (N/15 mm strip width) |

-continued

| | |
|---|---|
| Ultimate elongation: | EN ISO 1924-2 (N/l5 mm strip width) |
| Bursting: | in acc. with DIN 53141, Test surface area 10 cm² (kPa) |
| Flexural rigidity: | in acc. with DIN 53864, Specimen width 15 mm (cN · cm2) |
| Righting angle: | in-house test standard (°) |
| Droplet sink-in time: | in-house test standard (s) |
| Arrestance: | DIN 44 596 T2E |
| Filtration resistance: | DIN 44 956 T2E |

Righting Angle

The righting angle is measure of the resiliency after folding and is determined as follows: a specimen having a width of 100 mm and a length of 150 mm is folded in the middle parallel to the length, the filter side needing to face outwards. The fold is made with a steel roller (diameter 80 mm; mass 9 kg) in a direction so that the folded paper is located in the middle of the roller. The specimen springs back. The angle materializing after one minute is determined with a protractor.

Droplet Sink-in Time

The droplet sink-in time is a measure of how long a droplet of ink takes to fully sink into a material in simulating the response of the size in making the bag.

A droplet of ink (formulated of 50 ml Pelikan ink 4001 and 950 ml distilled water) is applied to the surface of the specimen with a burette from a height of 1 cm. The droplet sink-in time is stopped as soon as no bright locations are obvious on the surface.

The results are listed in Table 1.

Comparison Example 1

A paper ply as used in examples 1 and 2 in accordance with DE 38 12 849 C3 was produced and the same properties determined as in example 1. The results are listed in Table 1.

Comparison Example 2

A spun-blown nonwoven made by Don & Low Nonwovens Ltd., Angus DD8 IEY, Scotland was tested for the same properties as in example 1. The results are listed in Table 1.

TABLE 1

| | | Comp. Ex.1 | Comp. Ex.2 | Inv.. Ex.1 |
|---|---|---|---|---|
| Basis weight | g/m² | 45 | 31 | 45 |
| Thickness | mm | 0.20 | 0.28 | 0.27 |
| Rupture force longi. | N | 39 | 19 | 31 |
| Rupture force transv. | N | 22 | 11 | 14 |
| Ult.elongation longi. | % | 2.1 | 53 | 2.3 |
| Ult.elongation transv. | % | 4.2 | 47 | 4.6 |
| Air permeability | l/m²/s | 400 | 3800 | 2000 |
| Bursting pressure | KPa | 130 | 190 | 150 |
| Righting angle longi. | ° | 31 | >90 | 45 |
| Righting angle transv. | ° | 45 | 55 | 68 |
| Flex. rigidity longi. (30°) | cN cm² | 4.4 | 0.16 | 4.5 |
| Flex. rigidity transv. (30°) | cN cm² | 1.9 | 0.08 | 2.1 |
| Droplet sink-in time | sec. | 5 | * | 3 |

* Test was discontinued after 2h, since droplet failed to sink into the material.

As evident from the above Table the backing material ply in accordance with the invention combines the advantageous properties of a paper backing ply with the advantageous properties of a spunbond nonwoven.

Example 2

Processing a backing material as used in accordance with the invention

The backing material produced in example 1 was fused ultrasonically with a fibrillated fiber filter nonwoven (meltblown). Air permeability, arrestance and filtration resistance of the resulting multi-ply material were tested. The results are listed in Table 2.

Comparison Example 3

Example 2 was repeated, but using a paper ply as employed in DE 38 128 49 C2 in examples 1 and 2 instead of the backing material as used in accordance with the invention in example 1. The resulting multi-ply material was again tested as to its air permeability, arrestance and filtration resistance. The results are listed in Table 2.

Comparison Example 4

Example 2 was repeated, but using a spun-blown nonwoven as made by Don & Low Nonwovens Ltd., Angus DD8 IEY, Scotland instead of the backing material as used in accordance with the invention in example 1. The resulting multi-ply material was again tested as to its air permeability, arrestance and filtration resistance. The results are listed in Table 2.

TABLE 2

| | | Comp. Ex. 3 | Inv.. Ex. 2 | Comp. Ex. 4 |
|---|---|---|---|---|
| Basis weight [g/m²] | DIN ISO 536 | 45 (paper) 20 (melt-blown) | 45 (backing) 20 (melt-blown) | 31 (spbl nw) 20 (melt-blown) |
| Air permeability [l/m²s] | EN ISO 9237 | 230 | 600 | 675 |
| Arrestance [%] | DIN 44956 T2 E | 97.0 | 96.5 | 96.0 |
| Filtration resistance Δp1 [Pa] | DIN 44956 T2 E | 530 | 200 | 175 |
| Filtration resistance Δp2 [Pa] | DIN 44956 T2 E | 950 | 400 | 375 |

As regards the properties of the three two-ply materials tested it is thus to be noted:

Comparison Example 2
With Paper Outer Ply

Filter bags having this structure are prior art in continuing to exhibit the product disadvantages as described such as e.g. elevated filtration resistance resulting in lower volume flow, lower system vacuum capacity and a higher blockage tendency. These filter bags are, however well suited to production on conventional bag makers.

Comparison Example 4
With Spunbond Nonwoven Outer Ply

Although filter bags having this structure would exhibit significant advantages as regards filtration resistance and the resulting higher volume flow and lesser tendency to blockage in achieving a higher system vacuum capacity, as compared to current bags having a paper outer ply, these bags cannot be produced on conventional production machines (lack of ability to permit bonding, folding, stamping).

Example 2
With Backing Material In Accordance With the Invention

The bags in accordance with the invention combine the good features (low filtration resistance resulting in high volume flow, high system vacuum capacity and low bag blockage tendency) as would be exhibited by a spunbond nonwoven bag with the advantage of they permitting production on conventional bag makers.

What is claimed is:

1. A dust filter bag comprising at least one filter material ply and at least one backing material ply, wherein said at least one backing material ply possesses an air permeability of at least 900 l/m$^2$x s, a burst of at least 70 kPa, a rupture strength longitudinally better than 10 N and transversely better than 3 N, a flexural rigidity longitudinally better than 0.5 cN cm$^2$ and transversely better than 0.25 cN cm$^2$, a basis weight of 30–80 g/m$^2$ and a droplet sink-in time of less than 10 min.

2. The dust filter bag as set forth in claim 1, the righting angle of said backing material ply longitudinally and transversely is less than 90°.

3. The dust filter bag as set forth in claim 1, wherein the thickness of said backing material ply is in the range of 0.05–1 mm.

4. The dust filter bag as set forth in claim 1, wherein said backing material ply contains 20–90% by weight cellulose fibers, 10–80% by weight bicomponent fibers and 0–30% by weight binder, each relative to the weight of said backing material ply.

5. The dust filter bag as set forth in claim 4, said backing material ply additionally contains glass fibers.

6. The dust filter bag as set forth in claim 4, wherein said backing material ply additionally contains synthetic fibers.

7. The dim filter bag as set forth in claim 6, characterized in that said synthetic fibers and bicomponent fibers total at least 30% by weight relative to the weight of said backing material ply.

8. A method of producing a dust filter bag as set forth in claim 1, comprising the steps:

mixing fibers including cellulose fibers and fusible fibers into a homogeneous fiber mix, processing said fiber mix into a fiber web by wet laying, drying said fiber web, curing said dried fiber web by thermofusion into a backing material ply, processing said backing material ply with a filter material ply into a raw bag, finishing said raw bag into a dust filter bag.

9. The method as set forth in claim 8, wherein after drying said fiber web or after curing said fiber web by thermofusion it is impregnated with a binder.

10. The dust filter bag as set forth in claim 5, wherein said backing material ply additionally contains synthetic fibers.

* * * * *